United States Patent Office 3,502,616
Patented Mar. 24, 1970

3,502,616
ORGANOTIN SULFIDE STABILIZER COMPOSITION AND POLYMERS STABILIZED THEREWITH
Christian H. Stapfer, Echo Farm, Stony Brook Road, Newtown, Pa. 18940
No Drawing. Filed Sept. 20, 1966, Ser. No. 580,591
Int. Cl. C08f 45/62; C09k 3/00; B01j 1/16
U.S. Cl. 260—45.75                                6 Claims

ABSTRACT OF THE DISCLOSURE

A mixture of a dialkyltin sulfide and 0.1 to 35 percent by weight, calculated on tin, of a monoalkyltin sulfide is an improved stabilizer for halogen-containing resins.

---

This invention relates to improved stabilizer systems containing organotin sulfides and to resins stabilized therewith.

It is known that dihydrocarbyltin sulfides and polymers thereof are good stabilizers for halogen containing resins. Thereby, it is generally assumed that such sulfides are not simple monomers RR′SnS wherein R and R′ are monovalent hydrocarbon groups, preferably alkyl, but also aryl, alkaryl, aralkyl, or cycloalkyl, but cyclic trimers of the formula (1) 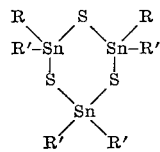

or even higher polymers (2) 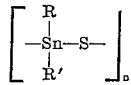

wherein $n$ is at least 4.

I have found that small additions of monoorganotin sulfides considerably enhance the stabilizing effect of the diorganotin sulfides. Such monoorganotin sulfides can be obtained similarly as the diaorganotin sulfides, by condensation of sodium sulfide with the corresponding monoorganotin trichloride. They are white crystalline compounds and believed to have a tetrameric structure represented by the formula (3) 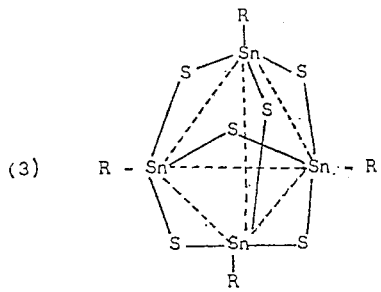

wherein R has the same meaning as above.

When heated, said compounds polymerize further to compounds (4)         $[(RSnS)_2S]_n$ wherein $n$ is $>4$.

Whenever reference herein is had to monoorganotin sulfides, polymeric compounds, whether or not they are correctly represented by Formulae 3 and 4, are included.

When diorganotin sulfides of Formula 1 or 2 are employed as stabilizers, their efficiency is considerably improved when about 0.1 up to about 35 percent, preferably about 1 to 25 percent, of the diorganotin sulfide, calculated as tin, is replaced by the monoorganotin sulfide. Further increase of the monohydrocarbyltin sulfide content does not seem to have any beneficial effect. Particularly good results are obtained when the ratio of the di- to the monoorganotin sulfide (calculated as tin) is about 3:1. Preferably, the R group in said organitin sulfides is an alkyl having 1 to 12 C atoms.

The good stabilizing effect of the diorganotin-monoorganotin sulfide combination is maintained or even further enhanced when it is employed in combination with, or when the dioganotin sulfide is partially replaced by, other organotin compounds. As such other tin compounds, any organotin stabilizers, except the sulfides, can be employed whereby said other tin compound may contribute about 1 to 70 percent by weight, calculated on tin, of the total tin stabilizer combination and whereby the above defined diorganotin to monoorganotin sulfide ratios should be maintained.

The number of organotin compounds which are available as stabilizers, increases almost daily. The most common representatives are either monomeric compounds having the formula (5)         $R_nSnX_{4-n}$ wherein $n$ is an integer from 1 to 3 and X may be, e.g., $OR^2$, $R^2COO$—, $R^2OOCR^3COO$—, —$SR$, —$OOCR^3SH$, $ROOCR^3S$—, $O$—$SO_2$—$R$, $S$—$SO_2R$—, wherein $R^2$ defines the same groups as R, and $R^3$ is a divalent organic radical, e.g., alkylene, or they may be polymers of the formulae (6)

a) 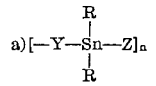

b) 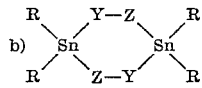

(c) 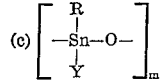

where Y and Z are organic radicals such as carboxylates, alkoxides, phenoxides, mercapto esters, mercaptides, mercaptols, mercaptals, phosphoric esters; $n$ varies from 1 to $\infty$ and $m$ varies from 3 to $\infty$.

The stabilizers of the present invention can be used with halogen containing resins, preferably those resins in which halogen is attached directly to the carbon atoms. As such halogenated resins there can be employed chlorinated polyethylene having 14 to 75%, e.g., 27%, chlorine by weight, polyvinyl chloride, polyvinylidene chloride, polyvinyl bromide, polyvinyl fluoride, copolymers of vinyl chloride with 1 to 90%, preferably 1 to 30%, of a copolymerizable ethylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-1-chloroethylene, acrylonitrile, chloroacrylonitrile, allylidene diacetate and chloroallylidene diacetate. Typical copolymers include vinyl chloride-vinyl acetate (96:4, commercially as VYNW), vinyl chloride - vinyl-acetate (87:13), vinyl chloride-vinyl acetate-maleic anhydride (86:13:1), vinyl chloride-vinylidene chloride (95:5), vinyl chloride-diethyl fumarate (95:5), vinyl chloride-trichloroethylene (95:5), vinyl chloride -2-ethylhexyl acrylate (80:20).

The mixture of stabilizers of the present invention can be incorporated with the resin by admixing in an appropriate mill or mixer or by any of the other well known methods which provide for uniform distribution throughout the resin compositions. Thus, mixing can be accomplished by milling on rolls at 100–160° C.

In addition to the novel mixture of stabilizers there can also be incorporated with the resin conventional additives such as plasticizers, pigments, fillers, dyes, ultraviolet light absorbing agents, densifying agents and the like.

If a plasticizer is employed, it is used in conventional amount, e.g., 30 to 150 parts per 100 parts of resin. Typical plasticizers are di-2-ethylhexyl phthalate, dibutyl sebacate, dioctyl sebacate, tricresyl phosphate.

In the stabilizer system, the monoorganotin sulfides act as synergists for the diorganotin sulfides, and the diorganotin-monoorganotin sulfide combination, in turn, acts as synergist for other organotin compounds. This synergism is particularly pronounced when the diorganotin-monoorganotin sulfide combination is used together with organotin carboxylates or phenoxides, whose long term stabilizing effects are increased fourfold when applied in the ternary system. But a synergism is also observed in systems with organotin compounds having a Sn-S bond other than the sulfides, e.g., organotin mercaptides and organotin mercapto esters, whose effect on "early color" is considerably improved by the presence of the monoorganotin-diorganotin sulfide combination.

The following examples are given to illustrate the invention but are not to be considered as limiting the scope of the invention.

EXAMPLE 1

Rigid poly (vinyl chloride) compositions were compared which consisted of 100 parts of the resin (Geon 103EP) and 0.2 part of mineral oil and which contained 0.45 part of tin in the form of various combinations of dibutyltin sulfide (DBTS) and monobutyltin sulfide (MBTS).

The compositions were milled for 5 minutes at 360° F., and samples of the obtained rigid films were then heated at the same temperature for 120 minutes in an air circulating oven. Samples of the films were removed from the oven at 100 min. intervals and compared for their relative degradation. In Table I below, the value T represents the number of minutes after which rapid degradation of the films began.

TABLE I

| Test No. | Stabilizer | P.p.h. | T |
|---|---|---|---|
| 1 | DBTS | 1.00 | 70′ |
| 2 | DBTS | 0.80 | 80′ |
|   | MBTS | 0.17 |   |
| 3 | DBTS | 0.50 | 60′ |
|   | MBTS | 0.42 |   |
| 4 | MBTS | 0.85 | 30′ |

EXAMPLE 2

The favorable influence of the diorgano-monoorganotin sulfide combination is maintained also when said combination is used together with another organotin compound in a ternary stabilizer system.

Using the standard resin composition of Example 1 again with an organotin stabilizer system supplying again 0.45 part of tin per 100 parts of the resin, excellent stabilizing results, i.e., a stability of 80 minutes for films tested as set forth in Example 1 were obtained with ternary systems which contained, calculated on the weight of the resin, 0.66 percent of DBTS, 0.14 percent of MBTS, and the following amounts of a third organotin stabilizer, bringing up the total tin content to 0.45 p.p.h.

| P.p.h. | Third organotin stabilizer |
|---|---|
| (a) 0.30 | Dibutyltin sebacate. |
| (b) 0.22 | Bis(monobutyl stannoxy)carboxyethyl thio-1,1-cyclohexane. |
| (c) 0.23 | Dibutyltin salt of a ethylene-maleic anhydride copolymer. |
| (d) 0.24 | Monobutyltin methyl salicylate. |
| (e) 0.35 | Dibutyltin bis salicylate. |
| (f) 0.25 | Dibutyltin bis thiodiglycolate. |
| (g) 0.55 | Dibutyltin bis stearate. |
| (h) 0.35 | Dibutyltin bis cinnamate. |
| (i) 0.48 | Dibutyltin bis nonyl phenoxide. |

In all ternary stabilizer systems containing as the third member a sulfur-free organotin stabilizer, the stabilizing effect of said organotin compounds was considerably enhanced by the presence of the DBTS-MBTS combination. When said compounds were tested, on an equal tin basis, (0.45% Sn), as stabilizers, alone, in absence of the DBTS-MBTS addition, they imparted generally a stability of only ten minutes.

In organotin mercapto stabilizers, the addition of the DBTS-MBTS combination resulted in an improvement of the so-called "early color," i.e., the thus stabilized resins did not show the early slight discoloration which is a well known drawback of the otherwise good organotin mercapto stabilizers.

EXAMPLE 3

Better than with conventional accelerated heating tests, the performance of stabilized rigid resin compositions is better evaluated and predicted by torque rheometer results. Therefore, comparative tests were made in a Brabender Plastograph with a conventional stabilizer, and the same stabilizer used in a ternary system with DBTS-MBTS, on an equal tin basis.

TABLE II

| Geon 103 EP | 100 | 100 | 100 |
|---|---|---|---|
| Wax | 0.2 | 0.2 | 0.2 |
| Dibutyltinmaleate | 1.3 | 0.23 | 0.8 |
| DBTS |  | 0.66 | 0.16 |
| MBTS |  | 0.14 | 0.14 |
| Stability time (min.) | 3.3 | 4.5 | 4.4 |

The organotinsulfides used in the examples were prepared as follows:

(A)

Poly (dibutyl tin sulfide)

628 g. of a 50% toluenic solution of dibutyl tin dichloride and 240 g. of sodium sulfide were brought to reflux. After 6 hours, 162 ml. of crystallization water from Na$_2$S was condensed and recovered. After cooling the reaction mixture and filtration of the sodium chloride, the toluene was evaporated and the resulting yellow oil slowly crystallized into a white solid melting at 42° C.

The compound corresponded to the formula $$[(C_4H_9)_2SnS]_3$$

and may be designated as 2,2,4,4,6,6,-hexabutyl-1,3,5-trithio-2,4,6-tristanno cyclohexane.

(B)

Poly (monobutyltin sulfide)

A solution of 55.8 g. of monobutyltin trichloride in 55.8 g. of acetone was added slowly under agitation at room temperature into a solution of 72 g. of sodium sulfide in 200 ml. of water. After one hour, the precipitated reaction product was filtered and washed with water. The resulting white solid corresponded to the formula 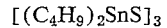 and decomposed at 210° C.

In similar manner, the corresponding dioctyl and monooctyl tin sulfides were obtained, which, when used as stabilizers like the corrsponding butyl tin sulfides, gave substantially the same results.

I claim:
1. As an organotin stabilizer mixture, a dialkyltin sulfide containing 0.1 to 35 percent by weight, calculated on tin, of a monoalkyltin sulfide wherein all alkyls have 1 to 12 carbons.
2. A composition comprising a resin selected from the group consisting of chlorinated polyethylene, polyvinyl chloride, polyvinylidene chloride, polyvinyl bromide, polyvinyl fluoride and copolymers of vinyl chloride with 1 to 90 percent of a copolymerizable ethylenically unsaturated compound and as a stabilizer 0.1 to 10 percent by weight of the mixture of claim 1.
3. A composition as defined in claim 2 containing, in addition, an organotin compound selected from the group consisting of organotin carboxylates and organotin phenoxides.
4. A composition as defined in claim 2 wherein said resin is a vinyl chloride resin.
5. The composition of claim 1 wherein said dialkyltin sulfide is dibutyltin sulfide and said monoalkyltin sulfide is monobutyltin sulfide.
6. The composition of claim 1 wherein said dialkyltin sulfide is dioctyltin sulfide and said monoalkyltin sulfide is monooctyltin sulfide.

References Cited

UNITED STATES PATENTS

| | | | |
|---|---|---|---|
| 3,021,302 | 2/1962 | Frey et al. | 260—45.75 |
| 2,746,946 | 5/1956 | Weinberg et al. | 260—45.75 |
| 3,027,350 | 5/1962 | Mack et al. | 260—45.75 |
| 3,058,943 | 10/1962 | Gray et al. | 260—33.6 |
| 3,108,126 | 10/1963 | Crauland | 260—429.7 |
| 3,183,238 | 5/1965 | Barbanson | 260—299 |
| 3,190,901 | 6/1965 | Polster | 260—429.7 |
| 3,201,408 | 8/1965 | Greco | 260—299 |
| 3,222,317 | 12/1965 | Kauder | 260—45.75 |
| 3,227,738 | 1/1966 | Klemchuk | 260—429 |
| 3,234,239 | 2/1966 | Johnson | 260—329 |

HOSEA E. TAYLOR, Jr., Primary Examiner

U.S. Cl. X.R.

252—400; 260—30.6, 31.8